Oct. 13, 1964  LA VONNE M. FELDHAHN  3,152,716
CONTAINER
Filed Aug. 2, 1961

INVENTOR.
LAVONNE M. FELDHAHN
BY
*Ezekiel Wolf, Wolf & Greenfield*
ATTORNEYS 3,152,716
Patented Oct. 13, 1964

3,152,716
CONTAINER
La Vonne M. Feldhahn, Danielson, Conn., assignor, by mesne assignments, to Expandolite, Inc., Plainfield, Conn., a corporation of Delaware
Filed Aug. 2, 1961, Ser. No. 135,395
15 Claims. (Cl. 220—31)

The present invention relates in general to containers and more particularly concerns a novel hinged container which may be made of expanded polystyrene at low cost to provide an easy-to-open container for securely enclosing and protecting fragile objects.

More molded expanded polystyrene contains are being used for a number of reasons. They are lightweight while affording considerable protection against shock. With these properties delicate components may be safely shipped, yet the protecting container contributes only a small fraction of the total weight of the transported package. Since expanded polystyrene is easily molded into virtually any shape, molding containers with inserts conforming to the shape of even odd-shaped objects, such as ornamental perfume bottles, eliminates the need for loose inserts, often required in conventional boxes, to keep the shipped object stationary in the container. And ornamentally molding and coloring the outside of the container makes the shipping container itself an attractive display package.

Despite these advantages, molded expanded polystyrene has been found to have one serious disadvantage. It is difficult to make a hinged container because conventional attaching means for hinges do not hold the hing in place.

Accordingly, it is an important object of the present invention to provide a reliably operating hinged molded expanded polystyrene container.

It is another object of the invention to provide a hinged container in accordance with the preceding object which is relatively easy and inexpensive to fabricate, assembles and opens easily, yet remains firmly and securely closed during shipment.

It is still another object of the invention to provide a hinged container in accordance with the preceding object which may be hinged about either of two spaced axes.

It is still a further object of the invention to provide a hinged container in accordance with the preceding objects formed of two like portions so that but a single mold may be used to fabricate both halves of the hinged container.

According to the invention, means define a cover portion and a base portion. A magnetic member, such as a steel rod or even a permanent magnet, is embedded in one of the cover and base portions near an edge thereof. A permanent magnet is embedded in the other of the cover and base portions near and edge thereof. The base portion and cover portion are aligned so that the magnetic member and permanent magnet coact to selectively hold the adjacent edges together, these adjacent edges being formed to permit sliding relationship allowing relative angular movement between the cover portion and the base portion about an axis generally parallel to the held-together edges. The magnetic member and the permanent magnet are preferably embedded in molded expanded polystyrene. In a preferred form of the invention, the cover portion and base portion are identical and selectively fit together to substantially fully enclose a volume internally thereof. Another feature of this preferred structure is that the container thereby formed may be hinged about either of two spaced axes.

Numerous other features, objects and advantages of the invention will become apparent from the following specification when read in connection with the accompanying drawing in which.

Throughout the drawing, corresponding elements are identified by the same reference numerals.

Figure 1:
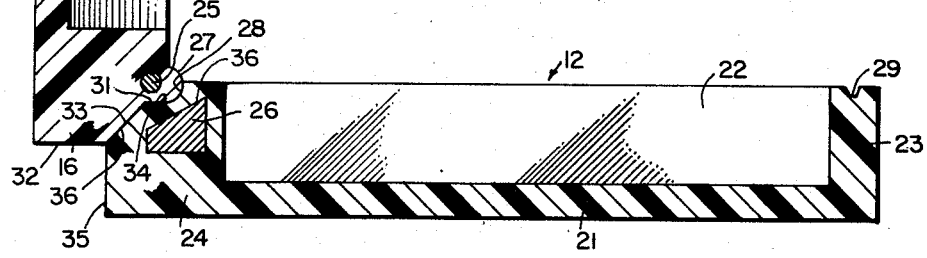
FIG. 1 is a side-sectional view of an exemplary embodiment according to the invention hinged about one axis.

With reference now to the drawing and more particularly FIG. 1 thereof, there is shown a side-sectional view through an exemplary embodiment according to the invention. Since this exemplary embodiment is a generally rectangular box, this view best and fully illustrates the features of the invention.

The container includes a top portion 11 and bottom portion 12. Top portion 11 includes a top wall 13, side walls 14, front wall 15 and rear wall 16. Bottom portion 12 includes a bottom wall 21, side walls 22, a front wall 23 and a rear wall 24. A magnetic rod 25 is embedded in rear wall 16 and attracted to the permanent magnet 26 embedded in rear wall 24 of bottom portion 12 to hold rear walls 16 and 24 together while allowing sliding relationship between the convex lower edge 27 of rear wall 16 and the concave upper edge 28 of rear wall 24.

The lower back edge 31 of rear wall 16 is joined to the top rear edge 32 by a beveled portion 33 forming an angle of substantially 45° with the generally parallel planes including edges 31 and 32.

With the container fully opened as shown, lower edge 31 rests on the top flat edge 34 of rear wall 24 which edge is joined to the lower back edge 35 by a beveled edge 36 at an angle of substantially 45° with the generally perpendicular planes including top edge 34 and bottom edge 35 so that the beveled edges 33 and 36 are in contact when the container is fully open as shown.

Bottom portion 12 is formed with a groove 29 for accommodating ridge 30 in front wall 15, the two coacting to prevent relative translational movement between top and bottom when the container is closed.

The axis of magnetic rod 25 is preferably outward from the center of the radius of curvature of the convex surface 27 and the concave surface 28 with the top fully open to coact with magnet 26 in establishing a force providing a counterclockwise moment tending to keep the top fully open. The arc subtended by curved surface 27 is 180° while that of concave surface 28 is 90° for the container shown in FIG. 1, permitting relative angular movement between top portion 11 and bottom portion 12 of substantially 90° about the axis of rotation.

The top surface of permanent magnet 36 is preferably generally parallel to the path followed by rod 25 when the container is changed from the fully opened position as shown to the fully closed position so that the magnetic force holding the container together does not change too much during opening and closing.

Figure 3:
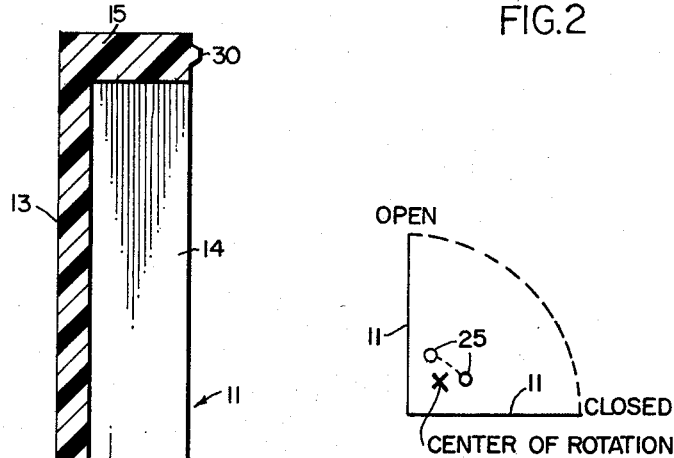
FIG. 3 is a diagrammatic illustration helpful in understanding how the invention maintains stable open and closed conditions.

With reference to FIG. 3, there is shown a diagrammatic representation of the path preferably followed by rod 25 about the center of rotation X as the top 11 is moved between the open and closed positions. With the top open, rod 25 is behind the center of rotation so that the magnetic force between rod and magnet develops a counterclockwise moment tending to keep the top open. With the top closed, rod 25 is in front of the center of rotation so that the magnetic force between rod and magnet develops a clockwise moment tending to keep the top closed, thereby obviating the need for a clasp or other fastener holding the far pair of unhinged edges together. Moreover, the rod and magnet provide a spring-like snap action as the magnitude and sense of the magnetically induced moment changes when opening and closing the container.

Figure 2:
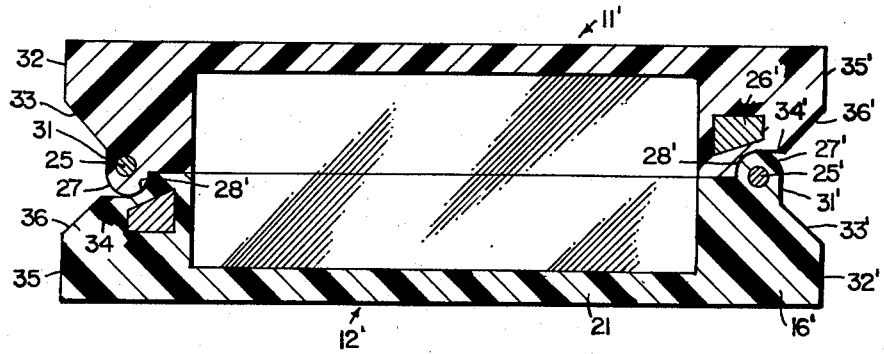
FIG. 2 is a side-sectional view of another embodiment according to the invention formed of two like portions making up a container hingable about either of two spaced axes.

With reference to FIG. 2, there is shown another embodiment according to the invention including two spaced sets of magnetically attracted elements, both sets coacting to keep the container closed while either one of the sets may be selected to provide the desired hinging function. Still another feature of the invention there illustrated is that both the top portion 11′ and bottom portion 12′ are identical structures. Thus, a single mold may be utilized to fabricate both portions of the container.

Basically, top portion 11′ is identical to top portion 11 with the exception that front wall 15 in top portion 11 is replaced by front wall 24′, corresponding exactly to rear wall 24 of bottom portions 12 and 12′. Bottom portion 12′ corresponds exactly to bottom portion 12 with the exception that front wall 23 and bottom portion 12 has been replaced by front wall 16′, corresponding exactly to rear wall 16 in top portions 11 and 11′. Since the structure of walls 16 and 24 have been described in detail above in connection with the description of FIG. 1 and walls 16′ and 24′ embody the same structure, further description thereof is unnecessary here.

However, a number of features of the container shown in FIG. 3 should be noted. First, sliding relative translation between the top portion 11′ and the bottom portion 12′ is prevented in one direction by the magnetic force exerted between rod and magnet and in the other direction by the vertical portions of the concave surfaces 27 and 27′ abutting those of concave portions 28 and 28′. The spaced edges magnetically attracted together keep the container tightly closed when desired. Yet, the beveled edges, such as 33 and 36 and 33′ and 36′, form convenient surfaces to be grasped for separating the adjacent edges and allowing the container to hinge about the other edge. The other pair of beveled edges near the axis of hinging rotation coact to function as a stop so that the lid will remain open in a stable position. When the container is open with the bottom and top portions forming a right angle, the center of mass of the top portion is to the outside of the hinging axis to develop a gravitational moment which adds to the magnetically induced moment tending to maintain stable equilibrium with the container fully open. The gravitational moment also helps keep the container closed.

There has been described a novel hinged container incorporating all the advantages attainable with molded expanded polystyrene while affording the advantages of novel hinging action with stable closed and open positions regardless of the material of the containers. Forming top and bottom portions as like structures further reduces fabrication costs.

It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. A hinged container comprising, means defining a cover portion, means defining a base portion, a magnetic member embedded in one of said cover and base portions near an edge thereof, a permanent magnet embedded in the other of said cover and base portions near an edge thereof, said magnetic member and said permanent magnet coacting to selectively hold said edges together, said edges being formed to permit sliding relationship therebetween allowing relative angular movement between said cover portion and said base portion about an axis generally parallel to said held-together edges, means for supporting said magnetic member and said permanent magnet in spaced relationship so that they coact to exert a magnetically induced moment about said axis tending to keep said container closed when said container is closed and exert a moment of opposite sense tending to keep said container open when said container is open.

2. A hinged container in accordance with claim 1 wherein said cover portion and said base portion are like structures.

3. A hinged container in accordance with claim 1 wherein both said portions consist almost entirely of molded expanded polystyrene.

4. A hinged container in accordance with claim 1 wherein said edges meet upon a surface curved about said axis.

5. A hinged container in accordance with claim 4 wherein said axis is substantially parallel to said surface.

6. A hinged container in accordance with claim 5 wherein points defining said surface are substantially equidistant from said axis.

7. A hinged container in accordance with claim 6 wherein said portions coact to selectively substantially fully enclose a volume internally thereof.

8. A hinged container in accordance with claim 2 wherein both said portions consist almost entirely of molded expanded polystyrene.

9. A hinged container in accordance with claim 2 wherein said edges meet upon a surface curved about said axis.

10. A hinged container in accordance with claim 9 wherein said axis is substantially parallel to said surface.

11. A hinged container in accordance with claim 10 wherein points defining said surface are substantially equidistant from said axis.

12. A hinged container in accordance with claim 11 wherein said portions coact to selectively substantially fully enclose a volume internally thereof.

13. A hinged container in accordance with claim 1 and further comprising, mechanical means for providing a moment counteracting with last-mentioned moment of opposite sense and coact therewith to maintain a stable open condition for said container.

14. A hinged container comprising,
means defining a cover portion,
means defining a base portion,
a magnetic member embedded in one of said cover and base portions near an edge thereof,
a permanent magnet embedded in the other of said cover and base portions near an edge thereof,
said magnetic member and said permanent magnet coacting to selectively hold said edges together,
said edges being formed to permit sliding relationship therebetween allowing relative angular movement between said cover portion and said base portion about an axis generally parallel to said held-together edges,
a magnetic member embedded in said other portion near a second edge thereof spaced from said first-mentioned edge, a permanent magnet embedded in said one portion near a second edge thereof spaced from said first-mentioned edge, said last-mentioned magnetic member and permanent magnet coacting to selectively hold said second edges together, said second edges being formed to permit sliding movement therebetween allowing relative angular movement between said cover portion and said base portion about a second axis generally parallel to said held-together second edges, whereby said portions may be selectively angularly displaced about either of said axes.

15. A hinged container in accordance with claim 14 wherein said cover portion and said base portion are like structures.

References Cited in the file of this patent

UNITED STATES PATENTS

| | | |
|---|---|---|
| 505,480 | Pletcher | Sept. 26, 1893 |
| 2,287,903 | Rathbun | June 30, 1942 |
| 2,308,625 | Rathbun | Jan. 19, 1943 |
| 2,393,568 | Root | Jan. 22, 1946 |
| 2,471,635 | Mark et al. | May 31, 1949 |
| 2,520,508 | Morrison | Aug. 29, 1950 |
| 2,552,641 | Morrison | May 15, 1951 |
| 2,784,757 | Bosca et al. | Mar. 12, 1957 |
| 2,791,346 | Tell | May 7, 1957 |
| 3,070,253 | Brown | Dec. 25, 1962 |

FOREIGN PATENTS

| | | |
|---|---|---|
| 16,754 | Great Britain | July 21, 1911 |
| 382,471 | Great Britain | Oct. 27, 1932 |
| 861,817 | Germany | Jan. 5, 1953 |